June 13, 1967   B. L. DICKINSON   3,324,508
APPARATUS FOR POSITIONING A LABEL IN A MOLD
Filed April 17, 1964
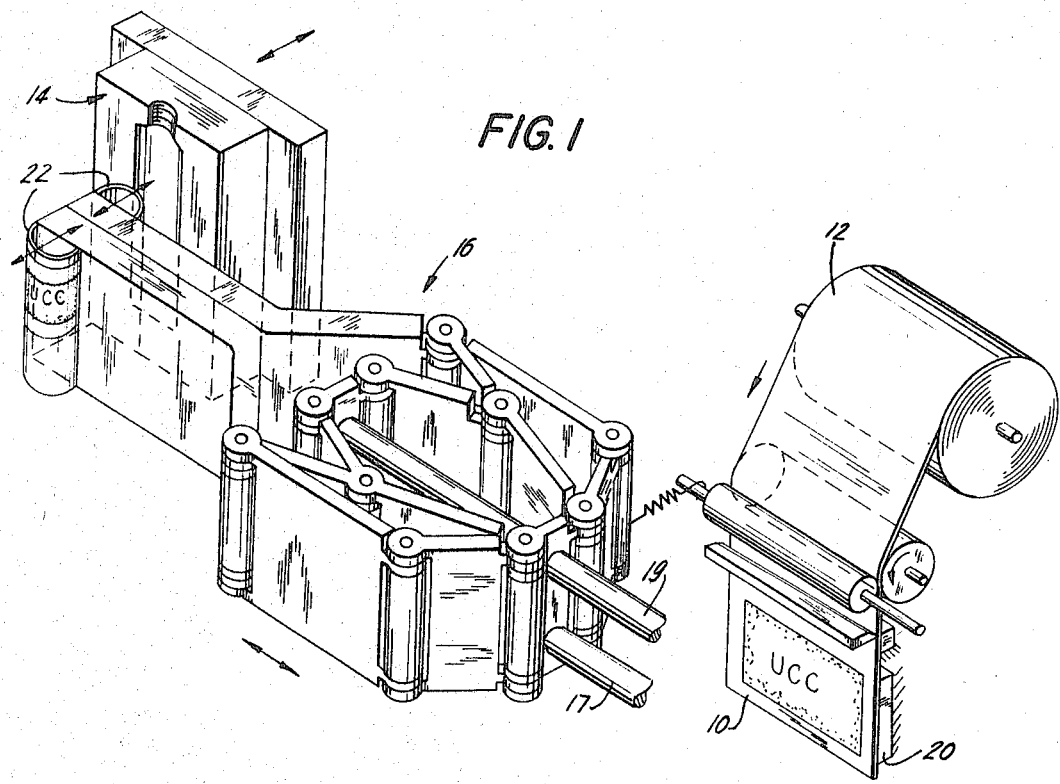
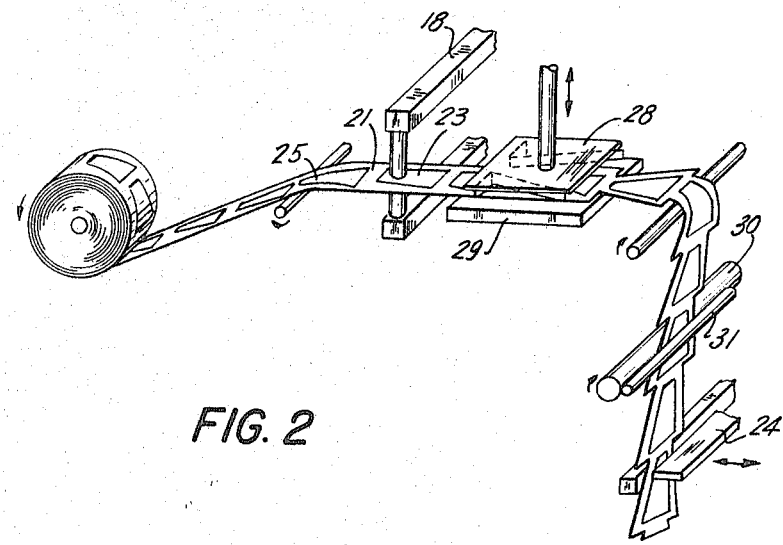
INVENTOR.
BARRY L. DICKINSON
BY
Sheldon H. Parker
ATTORNEY

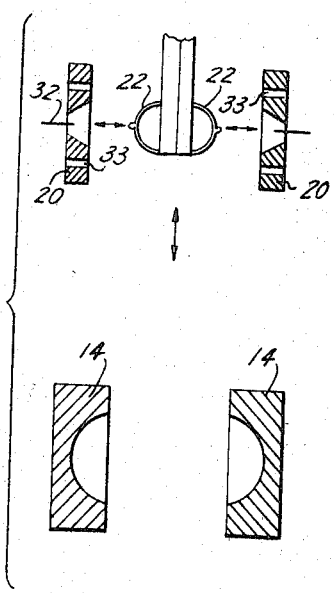
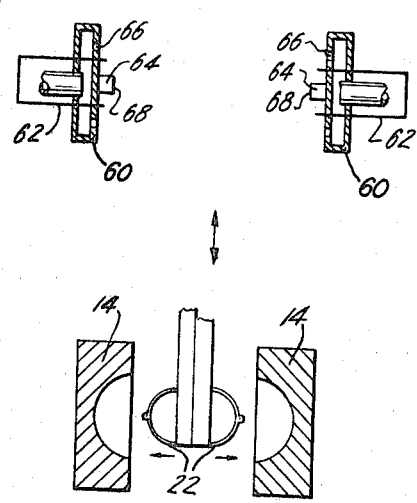
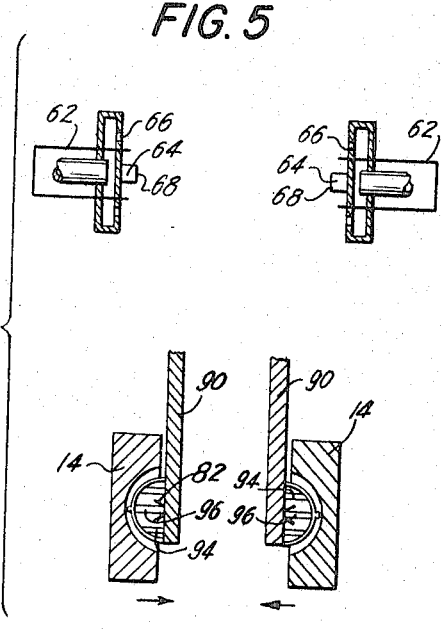
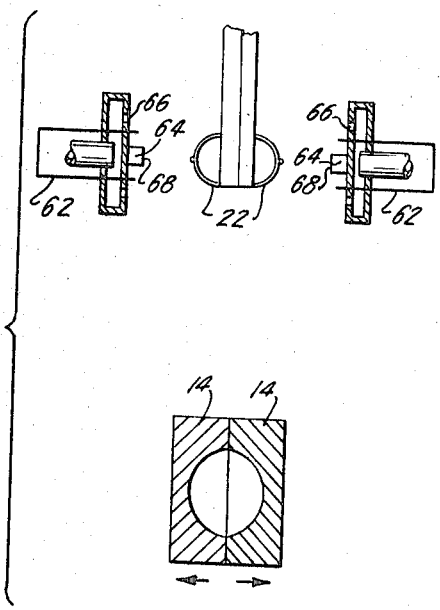

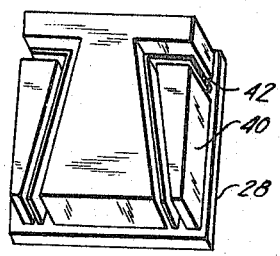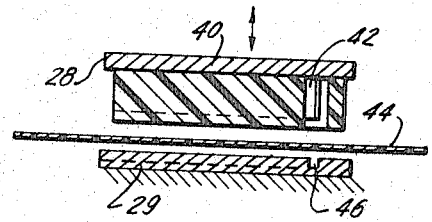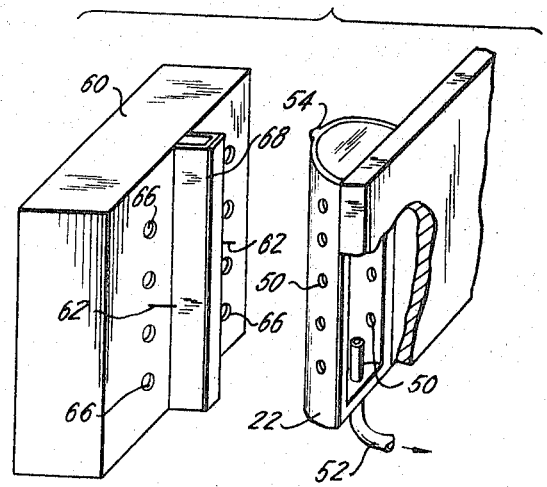

United States Patent Office 3,324,508
Patented June 13, 1967

3,324,508
APPARATUS FOR POSITIONING A LABEL IN A MOLD
Barry L. Dickinson, South Branch, N.J., assignor to Union Carbide Corporation, a corporation of New York
Filed Apr. 17, 1964, Ser. No. 360,701
5 Claims. (Cl. 18—5)

This invention relates to the labeling of plastic articles and more particularly, to the placing of labels in a mold prior to the forming of the article within the mold.

The decorating of plastic articles, such as blow molded bottles, meets with difficulty when conventional operations are employed. Inking processes such as a silk screen and dry offset require pre-treatment of the plastic surface in order to permit adequate adhesion of the ink to the plastic.

The hot stamping method employs a pigmented leaf from which pigment is deposited by pressure and heat onto the container to be decorated. This is accomplished by means of a heated die which has a relief or a raised image of the design to be printed. The die is pressed into the leaf and the container thereby transferring the pigment from the leaf to the plastic surface. The pigment becomes fused into the plastic. While the hot-pressed method often does not require a pre-treatment operation or the relatively long ink drying period of inking processes such as silk screen and dry offset, the cost of the die is high and a separate die and stamping operation is necessary for each color desired.

A transfer method of container decorating involves printing a design by the gravure process on a transfer paper previously prepared with a release coating. The transfer paper is then pressed into contact with the plastic container by means of a heated platen. This releases the ink from the coated paper and transfers it to the container. While this process permits economical printing of multiple colors and does not require an ink drying period, a pre-treatment of the surface of the plastic of the container and a post-treatment of the ink are necessary and the high cost or roto-gravure cylinders makes the process economically feasible only in large runs.

The use of a label permits free selection of the label material, and the copying and printing process and is normally economical even in small sized operations.

The problem that is encountered in the use of labels is the inability to obtain adequate adhesion of labels and plastic containers. Tacky, pressure sensitive adhesives do not require a pre-treatment of the plastic, but cannot provide permanent adhesion and, therefore, may subject labels to an undesired separation from a container. Nontacky, hard drying adhesives require a pre-treatment of the plastic and should not be used on containers of low rigidity, due to the fact that flexing of the container can cause separation of the adhesive from the plastic of the container.

It has now been found that labels can be used in conjunction with plastic containers through the use of a process which relies upon the fusion of the label to the container in order to obtain the required adhesion.

According to the present invention, an article labeling process is provided which includes applying a charge of static electricity to a static retaining label and securing the label to a mold by means of the static charge. While, the label is fixed in position in the mold, an article may be formed within the mold by means of a conventional process such as blow molding. The article will then fuse to the label to the required extent.

The label is advantageously, initially in a label roll and in a first zone is severed from the series of labels in the roll and then transferred to a second zone within the mold. The aforementioned charge of static electricity serves to secure the label to the wall of the mold. While the label is secured to the mold wall, the mold is closed and the article is molded.

A further aspect of the present invention includes an apparatus for use in the insertion of a fusible film into a mold. The apparatus includes basically means for applying a charge of static electricity to a label and a carrier member.

The carrier member is provided with at least one opening in a label contacting face of the carrier and means for intermittently providing communication between the opening and a vacuum producing means. A reciprocating transfer member moves the carrier member into and out of a mold cavity. The vacuum serves to secure the label to the carrier member during the transfer operation and the charge of static electricity serves to hold the label in position in the mold during a molding operation.

The invention will be better understood from the following specification wherein the invention is described by reference to the embodiments illustrated in the accompanying drawings wherein:

FIGURE 1 is a fragmentary perspective view of an apparatus according to the present invention, FIGURE 2 is a fragmentary perspective view of a modification of an apparatus according to the present invention, FIGURE 3 is a schematic illustration of one stage of operation according to the present invention, FIGURE 4 is a schematic illustration of a subsequent stage of operation, FIGURE 5 is a schematic illustration showing a further stage of operation, FIGURE 6 is a schematic illustration of a final stage of operation, FIGURE 7 is a perspective view of a trimming knife, FIGURE 8 is a side elevation partly in section showing a film positioned between a trimming knife and a back up plate, FIGURE 9 is a perspective view partly in section of a back up member and a carrier member, FIGURE 10 is a perspective view of a modification of a carrier member, and FIGURE 11 is an enlarged perspective view, partly in section of a further modification of a carrier member.

The labeling operation generally includes unwinding a continuous roll of labels, processsing the labels as required, as for example, by trimming the labels to a desired configuration, severing a label from the continuous roll of label, inserting the severed label into a mold, and fusing the label to a plastic article as the article is formed within the mold.

The term "label" as employed herein and in the appended claims refers to a substrate member upon which indicia may be printed by any desired method. The substrate member is preferably in the form of a thin, flexible, extensible film and is preferably at least in part, made of a material which is capable of both retaining a charge of static electricity during the molding operation, and being fused to the plastic of the container. While it is possible to provide a label with a coating on one surface and which will provide adhesion to the molded article, the direct fusion of the material of the label to the molded article is preferred because of the greater simplicity achieved. Thus, although any material capable of retaining a static charge at least for the period from charging to fusion can be employed, materials such as homopolymers or copolymers of olefinically unsaturated hydrocarbons, i.e., ethylene, propylene, styrene as well as cellulosic polymers are preferred.

As is well known in the art and seen for example, in U.S. Patents 256,476 and 2,311,156, the label can be reverse printed. That is, the label can be printed on that surface which is to be fused to the plastic of the container. The material of the label will thus serve to protect the printing from abrasion and the like. When employing reverse printing labels, the material from which the label is made must be of sufficient quality to permit the printing to be clearly seen. In this regard, low density polyethylene film approximately 3 mils in thickness has been found to be preferable because of the clarity of the film and the ability to fuse to molded articles such as containers.

The sequence of operations is best seen by following the travel of a label from the label roll until the label is fused to a molded article.

It is to be noted that the apparatus employed along the various stages of the process, may vary not only because of the various modifications which can be employed to carry out a particular operation, but also because of the changes in the mode. Therefore, the following description is directed to, first of all, a basic discussion of the sequence of operation, secondly, a description of ancillary process steps and the apparatus employed therein, thirdly, a detailed description of the various modifications of apparatus which can be employed at different steps in the basic process and finally, descriptions of various modes of operation. From the latter, it will become evident how the various modifications of apparatus are employed in combination.

The labeling operation as shown in FIGURE 1 consists basically of severing a label 10 from a series of labels in a roll 12 and inserting a severed label 10 into a mold 14 by means of a transfer mechanism indicated generally as 16.

The label advantageously can have a pattern thereon which through at least a portion of the label extends the full length thereof. As shown in FIGURE 2, this type of pattern permits the use of a photoelectric cell 18 which "recognizes" the clear space 21 between adjoining labels 23 and 25, and activates the apparatus each time the series of labels had advanced a distance equal to the length of one label. The term "length" as employed herein refers to the label dimension which corresponds to the direction of movement of the labels.

The use of a photoelectric cell in the foregoing manner permits different sized labels to be used interchangeably without necessitating the adjustment of the equipment since the equipment will be automatically activated in accordance with the dimensions of the label.

After traveling past the photoelectric cell 18, the label may be trimmed to a desired configuration by means of a trimming knife 28 and back-up plate 29. The trimming is primarily employed when labeling articles such as bottles having tapered configurations.

The use of molds which consist of matched "halves" results in an inability to process a label which extends around more than one half of the molded article. The trimming operation is thus employed to produce a label which has a configuration which corresponds to the configuration of the article being molded.

The series of labels then pass between a pair of rollers 30 and 31 at least one of which is powered in order to provide for the controlled movement of the labels.

The labels are subsequently gravity fed to a position in front of a back up member 20.

While a single label is held in a fixed position between the back up member 20 and a carrier member 22, a blade 24 is advanced forward and severs the single label of the remainder of the roll.

The severed label is affixed to the carrier head 22 in a manner which is hereinafter fully described, and the carrier head then travels to the position adjacent the molds 14, as shown in FIGURE 4. The carrier head travels to a position within the mold, as shown in FIGURE 5. The label is then transferred from the carrier head to the mold and held against the wall mold by means of a charge of static electricity on the label, as will be more fully discussed hereinafter.

With the labels firmly held in the mold, the carrier head returns to the position as shown in FIGURE 4, and then travels to the position as shown in FIGURE 6, during which time the mold is closed and an article is molded therein.

In regard to the more specific details of the labeling, it is seen the treatment of the labels so as to prevent the entrapment of undesirable air bubbles between the label and the molded article, may consist of a perforation operation which produces a plurality of minute air escape openings.

Advantageously, the label may be treated by placing the surface of the label which is to be fused to the molded article, in contact with a porous member. A metal plate formed by sintering together particles of a metal such as iron or nickel, or the like, is preferably employed as the porous member.

The label is heated to a temperature below the melting point of the label but preferably at least equal to the softening point of the material of the label. While the label is at the elevated temperature, a vacuum is drawn through the pores of the porous member, thereby drawing the surface of the label firmly against the surface of the porous member, and to some extent, into the peripheral pores of the member.

The surface of the porous member may be coated with a material, such as polytetrafluorethylene to which the label will not "stick" in order to prevent any undue adhesion of the heat label to the porous member.

The metal particles must have an average particle size not substantially in excess of about 50 microns and preferably about 25 microns in size in order to produce the desired textured label surface.

Label treating, or texturizing steps can be employed at any desired stage of the operation prior to the insertion of the label into the mold, as for example, before the labels are formed into a label roll, as well as at a stage in which the labels are traveling between the label roll and the mold. Advantageously, the labels may be treated after they have been unwound, and at a time when the motion of the labels is stopped as for example, during the label severing operation.

As shown in FIGURES 2, 7 and 8, the label trimming apparatus consists basically of a trimming knife 28 and a back-up member 29. When the label is in the desired position between trimming knife 28 and the back-up member 29, the knife 28 is moved into firm contact with the back-up member, thereby cutting the label.

It is desirable to provide the back-up 29 with grooves 46, which receive the cutting edge of the blades 42, as shown in FIGURE 8. When employing labels made from a material which is flexible, or extensible and which has a thickness in the order of about 1 mil, the label 44, may be forced into the groove 46, by the blade 42, without resulting in a cutting of the label 44.

The trimming knife 28 may be provided with a resilient material 40, such as a resilient foam, in order to produce a clean cutting operation. The foam is placed in the areas around the blades 42. Thus, as seen from FIGURES 7 and 8, when the trimming knife 28 is moved in the direction of the plastic film 44, the resilient material 40 which extends beyond the blades 42, contacts the film 44 and holds it taut against the back-up blade 29. Further movement of the trimming knife 28 results in the severing of the taut film due to the movement of the blades 42 in the grooves 46.

With regard to more detailed descriptions of the apparatus, attention is directed to FIGURE 3. The back-up member 20, shown therein, is provided with at least one wire probe member 32, which is connected to a source of a high voltage direct current.

The wire probe is preferably provided with a sharp, point end in order to produce a high voltage field which is capable of charging the extremities of a label as much as 12 inches from the end of the wire. The use of sharp ended probes also enables low DC voltages in the order of about 3 to 4 thousand volts to be employed. The wire is positioned within a tapered recess in the back-up member 20 which diverges in the direction of the label receiving side of the back-up member. Passages 33, provide means for supplying a gas, such as air under pressure, to the label receiving side of the back-up members 20, and are connected at the other end to a source of gas under pressure, not shown.

The modification of a back-up member 60, as shown in FIGURES 4, 5, 6 and 9 is provided with a pair of sharp pointed wires 62, which correspond to the wires 32, of the back-up member 20. The outlets 66 correspond in function and operation to the passages 33, of the back-up member 20. A protruding elongate member 64 is provided along a middle line of the back-up member 60 and is on the outer, or label receiving side of the back-up member 60. The outermost portion of the member 64 is preferably provided with an electrically conductive material 68 such as, semi-conductive polyethylene or the like. The conductive material 68 serves to prevent the accumulation of residual charges of static electricity on the outer surface of the member 64. It is noted that the back-up members 20 and 60, as well as the member 64 are preferably made of a non-conductive material such as methyl methacrylate, polyethylene or the like.

The carrier member 22, as shown in FIGURES 3, 4, 6 and 9, is a closed-end, semi-cylinder. As seen in FIGURE 9, a plurality of openings 50 are provided in the cylinder wall and a conduit 52 provides communication between the interior of carrier member 22 and a source of a gas under pressure and/or a vacuum.

Advantageously, the carrier head may be provided with a covering of a thin, resilient, member which has an enlarged area 54. The enlarged area provides a cushioning means so that the carrier head can be brought into a close and firm contact with the back-up member or mold.

Alternatively, as shown in FIGURE 10, a carrier head 70 can be employed. The wires 72 correspond to wires 62 of the back-up members 20 and 60 and are similarly connected to a source of a high voltage direct current. The carrier head is provided with several semi-cylindrical sections 74. Each of these sections are provided with openings 76 through which a vacuum can be drawn or air under pressure delivered, as previously noted in regard to carrier head 22.

The semi-cylindrical sections 74 are advantageously provided with a tapered configuration. The sections 74 are widest in their base portion 78, and narrowest at the outer portion 80 in order to provide the maximum open area in the zone of the wires 72.

A further modification of a carrier head is seen in FIGURES 5 and 11. A carrier head 90 may be provided, which has an open work semi-cylindrical section 92. The open work member has openings which are sufficiently large and numerous to provide a minimum amount of material between the wires 82 which correspond to the wires 72, of the carrier head 70 and the surface of the label. The open work member, however, must have sufficient structural rigidity to adequately support the label. The open work member 92, can for example, be made from a perforated curved sheet, a wire mesh or a series of wires or rods. A plurality of tubes 94 are provided which are alternatively in communication with a vacuum or a source of air under pressure.

As seen in FIGURE 11, a cushioning member may be provided, which consists of a narrow strip 98 of a resilient non-conductive material, such as polyurethane foam, rubber or a vinyl foam. The cushioning member 98 corresponds to the cushioning member 54, of the carrier head 22.

The narrow resilient strip 98 may be provided with a series of small openings therethrough. The enclosed member 96 which is employed basically for supporting and reinforcing the central section of the semi-cylindrical portion of the carrier head, may then be provided with communication means in order to establish a vacuum within member 96. The vacuum thus established within member 96, in combination with the vacuum produced by the conduits 94, serve to secure the label to the carrier head from the time the label is severed from the label roll until it is delivered to the mold.

The following operating procedures are exemplary of various modes of operations in accordance with the present invention rather than being indicative of the limits of the present invention.

OPERATION I

Employing a paired labeling apparatus such as shown in FIGURE 1, a 3 mil label consisting of low density polyethylene was inserted into each half of a mold prior to the blow molding of a low density bottle.

The labels were drawn between a driven rubber roll and a cast iron roll which was spring biased against the rubber roll. Each label was gravity fed to a position in front of a back-up member which consisted of a hollow rectangular box-like member with perforations in one wall, in the manner of the holes 66 of the back-up member 60.

A pair of carrier heads having the configuration of carrier head 22, of FIGURE 9, were employed in combination with a transfer mechanism, such as 16, of FIGURE 1.

The carrier heads 22 were caused to move in a plane transverse to the axis of motion of the transfer mechanism and toward the back-up members, by operating the transfer mechanism in the manner well known in the art. Basically, the movement of the actuating rod 17, in the direction away from the mold 14, relative to the actuating rod 19, causes the outward, transverse movement of the carrier head and conversely, the reverse movement of the actuating rod 17 causes the inward movement of the carrier heads.

With the label held between the back-up member and the carrier head, the labels were severed from the label roll by means of knife blades 24, and air was blown outwardly through the openings in the back-up member thereby causing each label to wrap around its respective carrier head.

The vacuum developed within the perforated carrier heads 22 by means of the conduit 52, served to hold the labels firmly against the carrier head. The carrier heads were first returned to their original position, such as shown in FIGURE 3, and then transferred into their position between the mold halves, as shown in FIGURE 4. In the manner previously noted, the carrier heads were transversely moved to a position within the mold halves, as shown in FIGURE 5. The termination of the vacuum within the carrier head, followed by the blowing of air through the openings 50, caused the label to transfer from the carrier head to the inner mold wall, and the static electrical charge developed at the time of contact with the rolls 30 and 31, caused the labels to remain in place while the mold closed and the carrier heads returned to their original position, as shown in FIGURE 6.

The mold temperature was maintained at 70° F. and the temperature of the parison just prior to the blow molding step was above 410° F. The labels were found to completely fuse to the molded article.

OPERATION I-A

The procedure of Operation I was employed, except in that the mold temperature was maintained at 70° F. and the parison was extruded at a temperature of 370° F. The label was found to inadequately adhere to the molded article.

OPERATION I-B

The procedure of Operation I was employed, except in that the mold temperature was maintained at 70° F. and the parison was extruded at a temperature of 390° F. The label was found to substantially adhere to the mold article but could be peeled away from the article.

The degree of adhesion of the label to the plastic is influenced by the material from which the label is made and particularly the melting point of the material, the thickness of the label, the temperature of the mold, the temperature of the parison, the material of the parison and in particular the melting point of the parison material.

As seen from the Operations I, I–A, and I–B, proper control of the foregoing features can be used to achieve a variation in the degree of adhesion and thus, if desired, a peelable label can be produced. On the other hand, if desired, a high degree of fusion of the label to the plastic of the container can be achieved whereby a label can be produced which will resist separation from the container even under severe abrasive conditions.

OPERATION I-C

The procedure of Operation I was employed, except in that the ambient conditions of temperature and humidity were elevated from the normal to 95° F. and 80% relative humidity.

A failure to consistently retain the labels within the mold was noted.

Ambient conditions such as humidity and temperature, effect the decay period of the charge of static electricity on a material and, therefore, particularly when operating under conditions such as high temperature and/or high humidity, the label can advantageously be brought into contact with a high voltage field in order to develop a large static electricity charge on the label, as seen in the following operations.

OPERATION II

The procedure of Operation I–C was employed, except that the back-up member further included wires 32 as shown in FIGURE 3, connected to a source of a 10,000 volt, direct current.

The semi-cylindrical portion of the carrier member 22 was formed from metal and grounded so that a high voltage field could be formed between the wire probes 32 and the ground. The current was turned on for a period of about ½ second, during the period in which the carrier heads advance toward the back-up member and the knife 24 severs the label from the label roll.

A consistent accurate register of the labels within the mold is attained.

It is noted, however, that in the foregoing operations, upon occasion, a label may fail to descend to its proper position in front of the back-up member. In these cases the labels or the back-up members appear to have a residual static electrical charge which results in the undesirable adhering of the label to the back-up member prior to the completion of the label's descent.

OPERATION II-A

The procedure of Operation II was employed, except in that the modified back-up member was employed. As seen in FIGURE 9, the back-up member 60 has a narrow contact surface 68, of polyethylene with carbon incorporated therein, in order to yield a semi-conductive material.

The high voltage field was produced by wire probes 62, in the manner as previously noted in regard to the wire probes 32, of the back-up member 20.

The consistent, accurate positioning of the labels within the mold as attained in Operation II, was similarly attained while the problem of labels adhering to the back-up member was no longer encountered.

OPERATION III

The procedure as set forth in Operation I was followed, except in that carrier members 70, having the configuration as shown in FIGURE 10, were employed.

The label charging operation took place, as the carrier and label moved from the position in front of the mold, as shown in FIGURE 4, to the position within the mold cavity, as shown in FIGURE 5.

As the carrier approached the mold, the vacuum which served to hold label against the carrier, was released and the high voltage field was developed between the wire probes 72 and the mold which served as the ground.

The static charge developed on the label caused the label to rapidly transfer from the carrier to the mold without the aid of air being blown through openings 76 as employed in the previous operations. The movement of the carrier to the mold was stopped while the carrier was still at least one eighth of an inch from the mold wall. The attraction of the mold for the charged label consistently resulted in the label being very accurately positioned within in the mold.

Several advantages are provided by reverse printing operations. Whereas in conventionally printed labels, the printing material which is in contact with the mold wall may interfere with the ability of the label to be maintained in contact with the mold wall, in reverse printed labels, this surface is free of printing. While the reasons for the interference with the labeling operation is not clear, it is evident that the presence of a printing material on the surface of the label in contact with the mold wall can destroy the force of attraction of between the mold wall and the label to the extent that the label may slip from its proper position or even completely fall away from the mold wall. An increase in the quantity of printing on the label will decrease the mold wall-label attraction and consequently the problem can be particularly acute as for example, in labels which are substantially entirely covered with decorative inks.

In the case of reverse printed labels, a problem can arise due to the ink which is between the label and the wall of the container to interfering with the adhesion of the label to the container, particularly when the material of the label and/or container is a polyolefin.

Techniques such as corona discharge, irradiation, chronic acid treatment and others have been employed to make adhesion to polyolefins feasible.

The difficulty with these techniques is that they modify the single most important property of the polyolefin, namely its inert character.

Labeling with reverse printed labels can be achieved by coating the surface of the label which has been decoratively treated, e.g., colored, uniformly or variegatedly, or printed with pictorial or literal information, with a layer of a carboxylic reagent modified wax, preferably a carboxylic acid, or carboxylic acid anhydride modified olefin polymer wax.

The term "modified-olefin polymer wax" refers to low molecular weight waxes, e.g., those having a molecular weight from about 1000 to about 5000 of polyolefins which have been reacted with a carboxylic reagent as defined below. The term "polyolefin" is used in the present specification and claims to denote normally solid homopolymers of mono-olefinically unsaturated hydrocarbons as well as normally solid copolymers thereof, with one or more than organic compounds copolymerizable therewith which contain polymer producing unsaturation, such as is present for example in carbon monoxide and formaldehyde and in compounds containing the ethylene linkage $>C=C<$ e.g., styrene, vinyl stearate, butene, vinyl acetate, vinyl formate, methacrylate, monobutyl maleate, 2-ethyl hexyl acrylate, N-methyl-N-vinyl acetamide, methacrylic acid, ethyl acrylate, acrylic acid, isoprene, butadiene, acrylamide, vinyl triethoxysilane, bicycloheptene, bicycloheptadiene, divinyl phosphonate and the like. Many other copolymerizable monomers which can be used in addition to these illustrative compounds are well known to the art. Preferred polyolefins in this invention contain at least 10 percent by weight of a combined mono-olefinically unsaturated hydrocarbon having from 2 to 4 carbon atoms inclusive i.e., butene-1, propylene and especially ethylene. The method of preparation of the carboxylic reagent modified olefin polymer waxes used in the present invention is in no wise critical. For example, these waxes can be prepared in general, by reaction of a carboxylic reagent with a low molecular weight ethylene polymer, polymerized directly to that weight, or a low molecular weight polymer obtained by the pyrolysis or thermal degradation of a high molecular weight polyethylene, e.g., having a density of from 0.88 to 0.97 and higher. Preferably, the polyethylene to be pyrolyzed is substantially linear and has a density of 0.94 to 0.97 as these pyrolysis products after modification provide the best adhesion. The pyrolysis is conveniently carried out in a heated pyrolysis tube at about 450°–600° C. but can be effected in any known manner.

In a preferred method of preparing the modified olefin polymer waxes, an olefin polymer wax, e.g., an ethylene polymer wax having a density above about 0.94 and a molecular weight of from about 1500 to 5000 is blended in the liquid phase, i.e., in the melt or in solution with from 1 to 25 percent by weight of a carboxylic reagent, e.g., maleic anhydride, and reacted by being agitated therewith at temperatures of from about 130° C. to about 250° C. and preferably above 180° C. With lower density ethylene polymer waxes, reaction temperatures of 80° C. and above are suitable. What is required is that the reaction mixture be agitatable. The blending and agitation can be carried out in any manner which insures intimate commingling of the reactants and good heat transfer throughout the reaction mass during the reaction time. For example, the olefin polymer wax can be dissolved in an inert liquid organic solvent for the wax and carboxylic reagent such as toluene, xylene, cyclohexane, methylcyclohexane, isooctane and chlorinated hydrocarbon solvents such as orthodichlorobenzene, 1,1,2-trichloroethane and α chloronaphthalene. The dissolving of a polyethylene wax is most conveniently accomplished at temperatures above 110° C. in aromatic solvents, for higher density polyethylenes.

It is preferred to effect reaction in the melt in the absence of an organic solvent by heating a high density polyethylene wax to its melting point (ca. 130° C.) and above e.g., to 180° C. and stirring in from 5 to 15 percent, based on the wax, of carboxylic reagent, e.g., maleic anhydride and continuing heating for 60–90 minutes. Temperatures of reaction either in solution or in the melt above about 250° C. confer no added benefit in speed of reaction or quality or modified wax obtained and, hence, will not be ordinarily used. The modification reaction can be effected under pressure to prevent undue volatilization of carboxylic reagent. The viscosity of the melted polyethylene waxes, e.g. 250–1000 centipoises at 2000° C. is such that rapid stirring of the carboxylic reagent is easily accomplished. The exact manner or order of addition of the reactants is not critical. Any excess carboxylic reagent is removed after the reaction as by vacuum distillation or like technique.

By the term "carboxylic reagent" as used throughout the present specification and claims, is meant an organic compound containing at least one carboxyl (—COOH) group and selected from the group consisting of carboxylic acids, substituted carboxylic acids and anhydrides of carboxylic acids. Preferably carboxylic reagent is selected from the class consisting of (1) carboxylic acids such as saturated monocarboxylic acids having from 2 to 6 carbon atoms, e.g., acetic acid, propionic acid, butyric acid, valeric acid, caproic acid, and the like, unsaturated monocarboxylic acids having from 3 to 6 carbon atoms, e.g., acrylic acid, crotonic acid, sorbic acid and the like; saturated dicarboxylic acids having from 3 to 10 carbon atoms, e.g., malonic acid, succinic acid, adipic acid, pimelic acid, glutaric acid, suberic acid, azelic acid, sebacic acid and the like; unsaturated dicarboxylic acids having from 4 to 10 carbon atoms, e.g., maleic acid, tetrahydrophthalic acid, fumaric acid, glutaconic acid, itaconic acid, and the like; (2) substituted carboxylic acids such as thioglycolic acid and, (3) carboxylic acid anhydrides, such as anhydrides of the foregoing acids, and especially of the unsaturated dicarboxylic acids e.g., maleic anhydride. All of these carboxylic reagents are capable of undergoing an addition reaction to one or more olefinic linkages occurring in olefin polymer waxes.

The application of the label can be readily accomplished by the use of a hot solution of emulsion of the wax, roller coating, dip coating, spray coating or otherwise contacting the substrate with the wax.

Adhesion to polyolefin surfaces can be imparted through the printing inks. In general, the printing ink compositions are prepared by adding to conventional printing inks, the carboxylic reagent modified olefin polymer waxes described herein.

Typical preparative techniques include fine grinding the modified wax, e.g., in a micropulverizer, micronizer or pebble mill, and blending with the conventional ink ingredients, e.g., one or more pigments or dyes and other modifiers in any convenient manner and at any time in the preparation of the inks. For example, the modified wax can be added to a pigment which is then let down to the desired viscosity by addition of some liquid, e.g., organic solvents such as aromatic hydrocarbons. Alternatively, the modified wax and pigment or dye can be pre-blended, e.g., by fluxing the modified wax on a two-roll mill, gradually adding and grinding in the pigment or dye and removing the blend obtained as a sheet or "pigment chip." Or a preblend can be made by incorporating the pigment or dye in a melt of the modified wax, as simply as by stirring to homogeneity, allowing the melt to cool and then handling as a pigment chip. If desired, and advantageously with the modified waxes here described, an aqueous emulsion of the wax can be prepared (as described below) and the emulsion blended with the pigment or dye. Preferably the pigment or dye is then added in some compatible liquid medium, e.g., water or alcohol. Also the pigment chips described above can themselves be emulsified and thus made into inks. In each of the foregoing techniques the conventional additives and modifiers for ink formulation can be present in the ink in the usual amounts. These additives and modifiers include among others, fillers, modifying resins, driers, liquid carriers, flow control agents and leveling agents.

The coloring compounds used in the modifier ink compositions of the present invention are the conventionally used dyes and pigments. Examples of these compounds are pigments such as cadmium yellow, cadmium red, cadmium maroon, black iron oxide, titanium dioxide, chrome green, gold, silver, aluminum and copper; and dyes such as alizarine red, Prussian blue, auramin naphthol, malechite green and the like.

The choice of ink formulation is widely variable and will be determined by the viscosity characteristics required by the particular printing method in which the ink is to be used. For example, flexographic inks, which are used to print on film have low viscosities, e.g., 22–25 seconds measured by a No. 2 Zahn cup, but silk screen inks, typically used to print on bottles and other containers, have very high viscosities e.g., 25,000 centipoises on a Brookfield viscometer. Generally, from 5 to 50 parts by weight, preferably from 15 to 35 parts by weight based on solids of the modified wax, is incorporated into 100 parts by weight of the commercially available inks.

herein when contacted with the polyolefin surface can be
The decorative coatings e.g., printing inks, taught herein when contacted with the polyolefin surface can be in either the fluid state, as in normal printing, or the solid state as well the ink is supported prior to contact by adhesion to a substrate, which is then laminated via the ink or otherwise to the polyolefin.

The criticalities of hot melt or solution application to polyolefin surfaces or incorporation into polyolefin or an ink formulation can be avoided by use of an anionic, cationic or non-ionic emulsion of the modified wax as the coating mixture. Typically, anionic water emulsions are prepared by melting together the carboxylic reagent modified polyethylene wax and a fatty acid such as, for example, formic, acetic, propionic, butyric, valeric, caproic, enanthylic, caprylic, pelargonic, capric, undecylic, lauric, tridecoic, myristic, pentadecanoic, palmitic, megaric, stearic, nondecylic, arachidic, behenic, carnaubic, hyenic, carborceric, cerotic, laccroic, melissic, montanic, psyllic, acrylic, crotonic, isocrontic, vinylacetic, methylacrylic, tigli, angelic, senecioic, hexenic, teracrylic, hypogeic, oleic, elaidic, erucic, brassidic, propiolic, propyloic, tetrolic, 2-butynoic, pentinoic, 2-pentinoic, amylproiiolic, palmiotic, stearolic, behenolic, sorbic, linoleic and linolinic acids and the like.

These acids have the general formula $$C_nH_{2n+(x)}COOH$$

wherein $n$ is an integer from 0 to 32 and $x$ is an odd number from $-5$ to $+1$ with the proviso that when $n=0$, $x=+1$. An amine soap is then added such as mono- and triethanolamine, monoisopropanolamine, diisopropanolamine, triisopropanolamine, morpholine, N,N-dimethylethanolamine and N,N-diethylethanolamine. The mixture is stirred until thoroughly mixed. Water which has been heated to about 130° C. under pressure is added. Pressure being maintained, the mixture is then vigorously agitated in a suitable device, e.g., a bladed mixer, colloid mill or other shear producing apparatus to form the emulsion. A carboxylic reagent modified polyethylene wax solids content of from 5 to 50 percent is preferred in emulsions to be used in the ink compositions of this invention.

The water emulsion of the maleic anhydride modified wax is readily mixed with both aqueous and alcoholic base pigment or dye inks and this mixture is easily coated onto or printed on a polyolefin substrate by any of the conventional techniques. The liquid of the emulsion is evaporated as for example, by allowing the emulsion to stand at room temperature or preferably by force drying as by air movement around and/or application of heat to the emulsion. Upon drying there remains a non-tacky and non-blocking coating which is adherent to polyolefin surfaces as well as numerous other materials.

OPERATION IV

A maleic anhydride modified polyethylene wax was prepared by extruding a 0.96 density resin from a screw extruder through a hot tube 48 inches in length, having a diameter of 3 inches and fitted with an axially positioned 2⅞ inch diameter torpedo, at a rate of 32 pounds per hour. The torpedo was heated to 425° C.

Sixty pounds of the resulting wax was reacted with 6 pounds of maleic anhydride for 90 minutes at 220° C. in a 15 gallon autoclave equipped with a Dowtherm jacket and a 6 inch turbine agitator. The reaction product was recovered by stripping the excess maleic anhydride under 5 mm. Hg pressure and removing the reaction product. The modified wax contained over 3 percent carboxyl (calculated as succinic acid) and had a viscosity of about 500 centipoises at 140° C.

One hundred grams of the above prepared modified wax was mixed with 20 grams of morpholine, 20 grams of oleic acid and 300 grams of water. The mixture was charged to a pressure reaction vessel and heated to 150° C. with agitation for ½ hour and immediately cooled. There was obtained a translucent emulsion having a solids content of about 30 percent (31.9%).

The emulsion thus prepared was applied to the surface of a low density polyethylene film which was previously printed with a flexographic ink. After air drying the coated film was inserted into a mold cavity, printed side of the film facing, in by means of the process as set forth in Operation III. The film had about 4.5 milligrams of dried coating per square inch of printed film surface. A high density polyethylene bottle was then blown in the mold.

The resultant polyethylene bottle had, in effect, a protective film over the printing. The label (printed polyethylene film) was adequately fused to the bottle.

OPERATION IV-A

The procedure as set forth in Operation III was followed, except in that reverse printed labels were employed in the process. The labels were the same as employed in Operation IV, but were not coated with the modified polymer of Operation IV. The label was readily peelable from the bottle due to inadequate fusion of the label to the bottle.

OPERATION IV-B

The procedure as set forth in Operation IV-A was followed except in that after drying, the film had about 5.7 mg./sq. in. of dried coating.

The label adequately fused to the blown bottle.

OPERATION IV-C

The procedure as set forth in Operation IV-A was followed except in that a film having about 1 mg./sq. in. of dried coating was employed. The resultant fused label could be peeled with moderate difficulty.

The weight of dried coating deposited on the film should, therefore, be at least about 0.5 mg./sq. in. in order to provide the desired degree of label to bottle fusion. Preferably, a coating weight of from about 1 to 2 mg./sq. in. is employed. Increased quantities of coating material not only fail to give further improvement, but they decrease the rapidity of the coating operation and can even necessitate the use of increased molding temperatures to produce adequate fusion.

Although the invention has been described in its preferred forms with a certain degree of particularity, it is understood that the present disclosure of the preferred forms has been made only by way of example, and that numerous changes in the details of operation and the combination and arrangements of parts may be resorted to without departing from the spirit and the scope of the invention.

What is claimed is:

1. An apparatus for applying a label to a molded article comprising a label back up member, means for feeding a label to said back up member, a carrier member, means for moving said carrier member in close proximity to said label back up member whereby a label can be held between said carrier member and said label back up member, means for producing a high D.C. voltage field between said carrier member and said label back up member to impart an electrostatic charge to said label, means for moving said carrier and said label to a position in close proximity to a cavity wall of a mold so that said label when contacted with said mold adheres thereto by force of said electrostatic charge.

2. The apparatus of claim 1 wherein the carrier member is provided with at least one opening therein and means for selectively providing communication between said opening and a source of gas under pressure and a vacuum.

3. The apparatus of claim 1 wherein the carrier member is provided with at least one opening therein and means for providing connection between said openings and a vacuum producing means.

4. An apparatus for use in the insertion of a fusible film into a mold comprising: a carrier member having at least one opening in a film contacting face of said carrier member; means for intermittently providing communication between said opening and a vacuum producing means; a transfer member for reciprocatably moving said carrier member into and out of a mold cavity; and charge means for developing a charge of static electricity on said film a portion of said charge means being mounted on said carrier.

5. The apparatus of claim 4, wherein said carrier member includes at least one wire probe, said wire probe being in electrical communication with a source of a high voltage direct current and being recessed from the film contacting face of said carrier member.

References Cited
UNITED STATES PATENTS

| | | | |
|---|---|---|---|
| 3,068,528 | 12/1962 | Owens | 264—22 |
| 3,072,969 | 1/1963 | DuBois | 264—94 X |
| 3,151,193 | 9/1964 | Thornton | 18—5 X |

J. SPENCER OVERHOLSER, *Primary Examiner.*

W. L. McBAY, *Examiner.*